May 9, 1950

D. C. HARVEY 2,507,156

DOUBLE EXPOSURE PREVENTION DEVICE FOR ROLL-HOLDING CAMERAS

Filed July 30, 1948

DOUGLASS C. HARVEY
INVENTOR

BY
ATTORNEYS

May 9, 1950

D. C. HARVEY 2,507,156

DOUBLE EXPOSURE PREVENTION DEVICE
FOR ROLL-HOLDING CAMERAS

Filed July 30, 1948

DOUGLASS C. HARVEY
INVENTOR

BY *(signatures)*

ATTORNEYS

Patented May 9, 1950

2,507,156

UNITED STATES PATENT OFFICE 2,507,156

DOUBLE EXPOSURE PREVENTION DEVICE FOR ROLL-HOLDING CAMERAS

Douglass C. Harvey, Rochester, N. Y., assignor to Eastman Kodak Company, Rochester, N. Y., a corporation of New Jersey Application July 30, 1948, Serial No. 41,648

7 Claims. (Cl. 95—31)

This invention relates to photography and more particularly to improvements in double exposure prevention devices of the type including connections between a film-winding mechanism and a shutter. One object of my invention is to provide a double-exposure mechanism in which the shutter trigger operates noiselessly in an exposure-making direction until the exposure is made. Another object of my invention is to provide connections between a trigger-latching mechanism and a film-winding mechanism which will operate in such a manner that there is but little chance of even an inexperienced camera operator operating the mechanism in an improper manner. A still further object of my invention is to provide a simple, inexpensive, and readily assembled mechanism which will eliminate double exposures even in the hands of inexperienced operators.

This application is for an improvement over the double-exposure prevention camera shown in U. S. Patent 2,367,504, Hutchison, Jr., granted January 16, 1945, and the shutter of this camera which is shown in his Patent 2,423,706, granted July 8, 1947. In the first-mentioned patent, the mechanism worked satisfactorily and reliably under normal operating conditions. However, certain camera operators could press the trigger very slowly and, when so doing, a clicking noise, similar to the sound of a shutter operating, could be produced, so that if the trigger should be then immediately released, it might be possible to fail to operate the shutter. This condition very seldom occurred, but, in order to prevent it from occurring, careful assembly and timing of the time when the unwanted noise occurred had to be done in the factory, adding expense to the camera. A certain number of cameras could not be timed to prevent this noise which occurred when the spring arms locking the trigger dropped from an inoperative position, shown in the patent in Fig. 11, to the position shown in Fig. 12. My present invention is particularly directed to eliminating any noise whatsoever on the downward motion of the trigger so that the above difficulty cannot occur. I have eliminated this possibility by transferring the objectionable noise of the locking levers (which must occur at some time during the operation of the shutter unless expensive and complicated means are employed to prevent the noise) from the downward stroke of the push button to the return stroke of the push button so that no noise occurs until the exposure is made. Since the noise can only occur after the exposure is made, the shutter cannot be improperly operated even by an inexperienced operator. While it is obvious that various different pushbutton type shutters may be employed with my invention, the Hutchison shutter, shown in the second-mentioned patent, was designed for the camera herein illustrated and is entirely satisfactory. I, therefore, prefer to use this shutter as illustrating an embodiment of my invention.

Coming now to the drawings wherein like reference characters denote like parts throughout:

Figure 1:
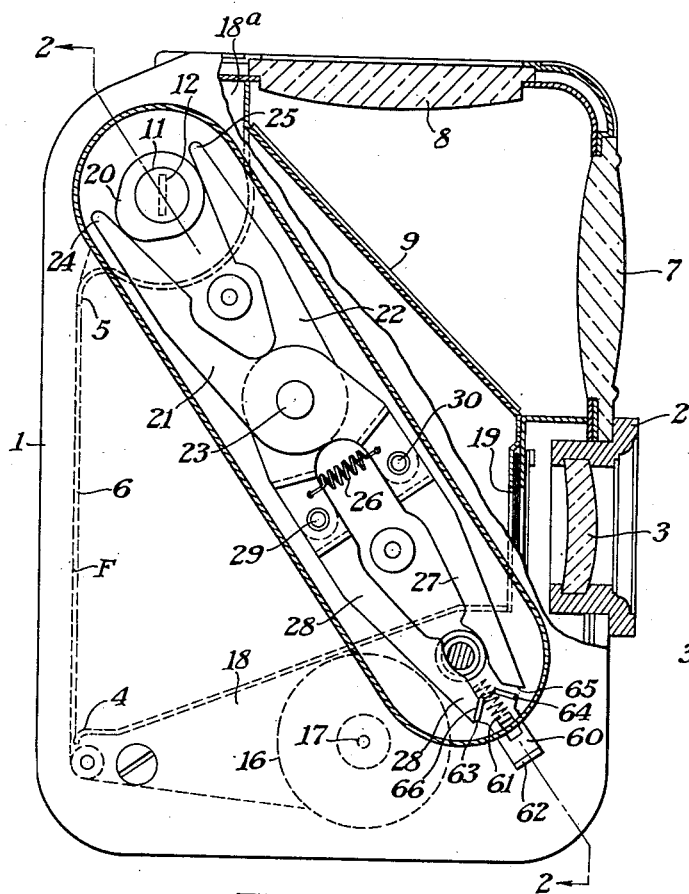
Fig. 1 is a side elevation shown partially in section illustrating a preferred embodiment of my invention.

My invention is for an improvement over the double-exposure prevention device shown in the first above-mentioned Hutchison patent, the improvement being primarily directed to changing the time of the latching noise as the shutter rod is operated from occurring on the downward motion of the shutter rod, as happened in the Hutchison patent, to a noise which can only occur after the shutter trigger has been fully depressed and released. Consequently, since the noise may only occur on the releasing stroke, the operator cannot be fooled into believing that an exposure is made before the exposure is actually completed.

A preferred form of my invention may consist of a camera body 1 having a lens mount 2 carrying a camera lens 3 designed to produce an image on a film F lying across an exposure frame bounded by the plates 4 and 5. Side rails 6 complete the exposure frame. The camera may be equipped with a finder having a front lens 7 and a viewing lens 8 spaced above a mirror 9 for reflecting the image upwardly.

The camera is provided with a winding knob 10 attached to a post 11 for turning a web 12; this web, in turn, engaging and turning a slot 13 carried by the flanges 14 of a spool 15. There is a spool 16 adapted to be positioned by centering pin 17 in a supply film chamber 18 and a spool 15, as above described, is located in a take-up spool chamber 18a. A shutter designated broadly as 19, in this instance, lies behind the objective 3.

The winding key post 11 carries a cam 20 which cam is positioned to engage and move a pair of scissor-like arms 21 and 22 mounted on a pivot 23 on the camera wall. These arms have ends 24 and 25 which lie in the path of the cam 20 to be moved thereby, a spring 26 holding the arms against the cams. At the opposite ends of the arms 21 and 22 there are spring arms 27 and 28. These spring arms may be formed of the metal of the scissor-like levers, but, to gain added resilience, I prefer to rivet these arms, as by rivets 29 and 30, to the levers 21 and 22, as this tends to improve the function of the apparatus and permit it to work under a very light spring pressure. As thus far described, the camera is like the Hutchison, Jr. patented camera mentioned above.

My improvement consists primarily in providing a lost motion or friction connection between part of the mechanism and the camera body which enables me to eliminate one of the springs used on the Hutchison shutter to reduce the number of parts to make the downward stroke of the shutter rod silent and to facilitate assembling the camera.

Figure 2:
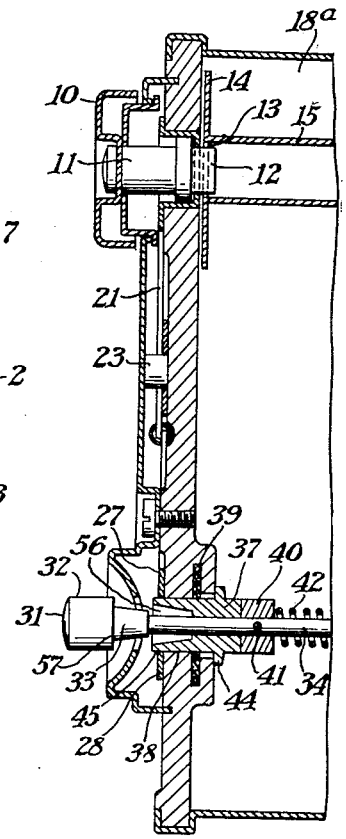
Fig. 2 is a sectional view taken on line 2—2 of Fig. 1.
Figure 3:
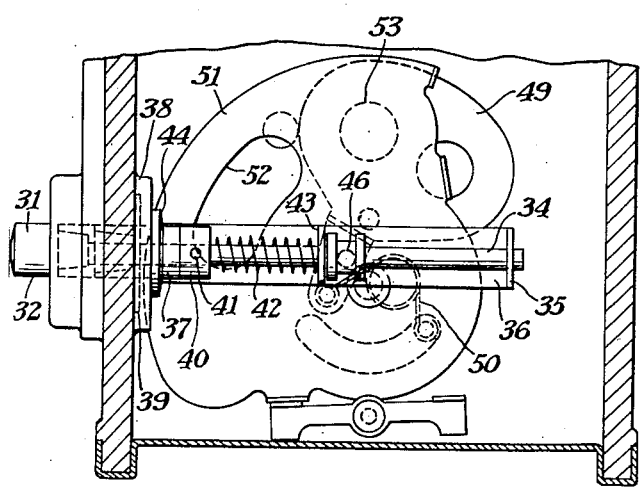
Fig. 3 is a fragmentary sectional view showing the shutter rod and associated mechanism and its connection with a camera shutter.

Referring particularly to Fig. 2, it will be noted that the push button or trigger 31 has a smooth outside surface 32, here shown as being cylindrical in shape, and includes a tapered truncated cone-shaped portion 33. This trigger forms a part of the shutter rod 34, or it may be attached thereto in a suitable manner. The trigger rod 34, as shown in Fig. 3 may move in a bearing 35 in the bracket 36, and at the opposite end may move in a collar 37, which collar may move in a bearing 38, being retarded in its movement by a friction washer 39. This washer may be of leather or other suitable material and merely tends to hold the collar 37, although the collar may slide on the shaft 34, as will be more fully pointed out. The rod 34 includes a second collar 40 which is attached as by a set screw 41 to the rod 34 and a spring 42 rests against the second collar 40 and against a flange 43 as shown in Fig. 3. The rod 34 also passes through this flange. Thus, the spring 42 normally tends to thrust the push button 31 outwardly and into a normal rest position. There is a flange 44 which limits the outward movement of the collar 37.

Figure 7:
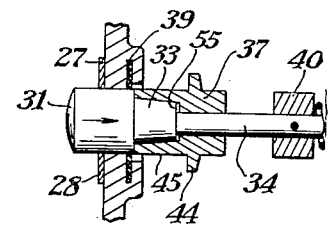
Fig. 7 is a view similar to Fig. 5 but with the parts in the position for releasing the shutter.
Figure 8:
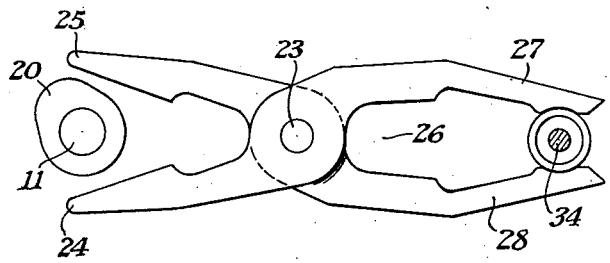
Fig. 8 is a view similar to Fig. 6 with the trigger released, as occurs after a film has been wound.

It should be noticed that the collar 37 has a smooth exterior wall 45 which is of the same configuration—here cylindrical—as the wall 32 of the trigger 31 and of the same diameter, so that when these members rest together, as shown in Fig. 7, for instance, a smooth exterior is presented over which the spring-latching arms 27 and 28 may slide noiselessly as the trigger is being moved inwardly.

The rod 34 carries a pin 46 which engages a cover blind 49 so that this cover blind, through a hair-pin type spring 50, may operate the shutter blade 51 in a known manner and as described more fully in the second-mentioned Hutchison application. This causes an exposure slot 52 to pass the exposure aperture 53 and make an exposure in a known manner. The shutter itself, except for the trigger mechanism, forms no part of the present invention and is like the Hutchison patents above described.

Figure 4:
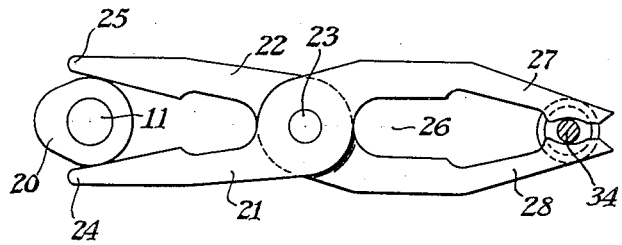
Fig. 4 is a schematic view of the shutter locking members in a latched position which they assume after an exposure has been made and before a film has been wound.
Figure 5:
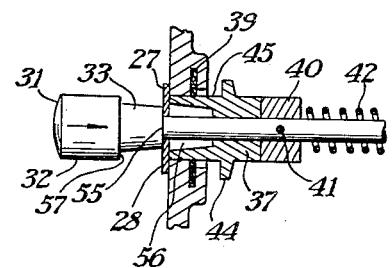
Fig. 5 is a fragmentary sectional view of parts shown in Fig. 4, the trigger being pushed in partially and being latched against operation.
Figure 6:
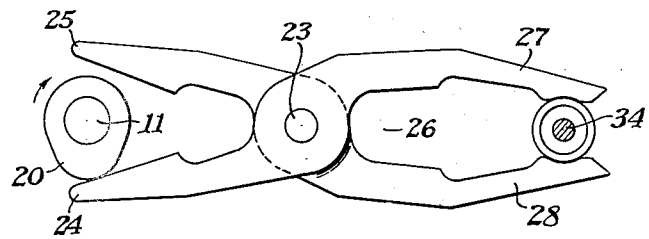
Fig. 6 is a view similar to Fig. 4, but with the trigger shown in an inward position releasing the shutter and making an exposure.
Figure 9:
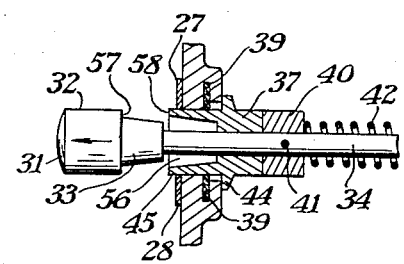
Fig. 9 is a view similar to Fig. 7 but with the trigger in position to make an exposure.
Figure 10:
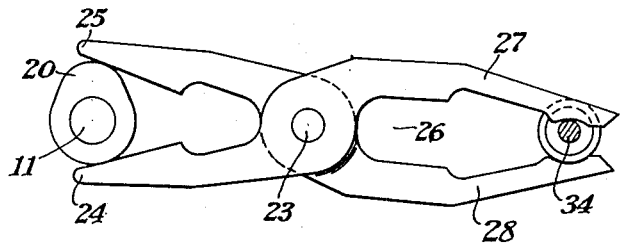
Fig. 10 is a view similar to Fig. 8 showing the locking levers in the position they assume after a partial turn of the winding key has been made, releasing one arm from its locking position.
Figure 11:
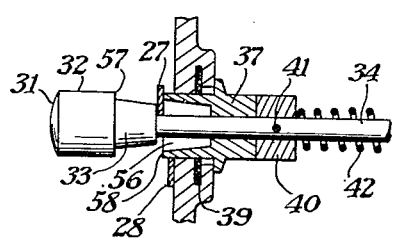
Fig. 11 is a view similar to Fig. 9 but with the trigger still latched after only one lever has been released.

Referring to Figs. 4 to 11 inclusive, Fig. 4 shows the resilient portions 27 and 28 of the pivoted levers 21 and 22 in an operative position for latching the partially depressed trigger push button 31 against further movement. Here, the levers 27 lie between the shoulder 55 and the camera wall 56. Obviously, the trigger cannot now be thrust further in the direction shown by the arrow. By releasing the trigger 31, it will be moved outwardly by spring 42 into the Fig. 11 position. If the operator wishes to take a picture, the winding knob 10 should be turned, turning the winding shaft 11, the cam 20, and successively engaging and moving the rigid portions 24 and 25 of the levers to be successively moved from their latching position. When this occurs, one resilient latching portion after the other engages the end of the collar 37, as shown in Fig. 9, and after both arms engage the smooth outer periphery 45 of the collar, the film winding has been completed and the shutter is ready to operate. Fig. 7 shows the position of the parts as the trigger is operated, and this movement occurs in the following manner. Pressure on the push button 31 moves it inwardly against the pressure of spring 42 while the collar 37 remains in its Fig. 9 position, because of the friction of the washer 39. Thus, the trigger moves into the recess 56 of the collar 37 and the trigger edge 57 lies against the collar edge 58, forming, in effect, one smooth cylindrical member as shown in Fig. 7. Continued downward pressure on the button 31 slides the collar 37 on the shutter rod 34 until the exposure is made and, during this downward motion, the resilient portions 27 and 28 of the lever arms 21 and 22 slide silently along the cylindrical portions 32 and 45 of the push button and collar. Fig. 7 shows the parts with the trigger fully depressed and just after an exposure has been completed. If the push button 31 is now released, it will move outwardly under the impulse of spring 42, but the collar 37 will tend to remain in the position shown in Fig. 7 because of the friction collar 39. As the trigger moves outwardly, the resilient portions 27 and 28 of the arms 21 and 22 snap down; first, on the tapered portion 33 of the trigger and later behind the shoulder 55 of the trigger to prevent operation of the trigger until the winding key is again turned.

From the above description it will be noticed that during the downward motion of the trigger there can be no noise between the resilient portions 27 and 28 of the locking arms before an exposure occurs because these resilient portions merely slide over a cylindrical surface—first, that of the collar 37 and, later, that of the trigger 32. After the exposure is made, any clicking, or other noise, is entirely immaterial so that when the resilient arms 27 and 28 do move to a latching position, they do so without any tendency to indicate that an exposure has been completed. In addition, it will be noticed that my improvement over Hutchison has eliminated a shutter-operating spring which was formerly necessary and has made it possible to reduce the length of the trigger rod. A friction washer has been added to produce the lost motion between the collar and the push button and trigger rod. This lost motion occurs in both directions since, during the first pressure upon the push button, the collar will remain stationary until engaged by the push button, at which time both the collar and push button will move together. After an exposure has been made, the spring 42 thrusts the second collar member 40 outwardly until it engages the first collar member 37 so that here, again, the first collar 37 is frictionally held until positively engaged by the second collar member 40. This enables the trigger 31 to separate from the collar 37 so that the resilient portions 27 and 28 of the latching levers may move into a latching position which prevents effective movement of the trigger 31, even though some movement is prevented. These latching levers prevent the trigger from moving a distance sufficient to either operate the shutter or to interfere with the above-mentioned cycle of operations.

Double exposures are not usually desired, but on occasion for trick photography they may be useful. In order to permit this, as indicated in Fig. 1, a slide member 60 is normally pressed outwardly by a spring 61. This slide has an upturned handle 62 on one end and a pair of flanges 63, 64 on the opposite end. These flanges may engage tapered wall 65 and 66 on the resilient portions 27 and 28 of the levers so that these levers may be manually cammed apart to release the trigger without turning the film-winding knob 10. Thus, if desired, two exposures may be made on one film. However, this mechanism is not often used.

When an operator wishes to make an exposure, the push button 31 is depressed, moving inwardly until it engages the collar 37. Since the resilient latching arms 27 and 28 are then engaged on the smooth periphery of the collar 37, they are merely transferred to the smooth periphery 32 of the push button 31, this movement occurring silently as the trigger is moved inwardly. When an exposure has been completed, the spring 42 moves the push button 31 outwardly before the collar 37 moves so that the resilient portions 27 and 28 may then snap down successively, or together, into their latching position from which they may be released by winding a fresh area of film into place, or, in exceptional circumstances, from which they may be released by the slide 62.

I prefer a friction washer of leather, rubber (real or artificial), fiber, or felt, since such washers may also be used to seal off light from the trigger aperture to the inside of the shutter. However, metal frictional members are quite satisfactory and a double-click stop may be employed if light leak is not a problem. "Frictional member," as used in the claims, is to include a member having frictional contact with the trigger for retarding operation thereof of any of the types mentioned above or equivalents thereof.

I claim:

1. An improvement in double exposure prevention devices for roll-holding cameras of the type including a camera body, a film-winding key post carrying a cam, a shutter, a shutter trigger for operating the shutter including a rod and a push button on the end of the rod for releasing the shutter, a collar slidably mounted on the rod, a pair of levers both pivotally mounted on the camera body and provided with cam-engaging portions and resilient portions positioned to engage and release the trigger and collar, said improvement comprising a frictional member carried by the camera and engaging and tending to retard movement of the collar mounted on the rod, said collar being movable in one direction by the push button, and means carried by the rod for moving the collar in an opposite direction, said means and push button being spaced a distance greater than the length of the collar, the collar and push button having outer surfaces in alignment and positioned opposite the resilient portions of the pair of lever arms and forming smooth slideways on which the resilient portions of the arms may slide when the edges of the collar and push button lie together, said collar and push button being movable one against the other whereby the resilient portions of the levers may slide from one to the other when the push button is moved into contact with and moves the collar against the frictional member carried by the camera, said push button being movable in a reverse direction while the collar is frictionally held, enabling the resilient portions of the levers to drop down between the separated push button and collar, thereby limiting inward movement of the push button.

2. An improvement in double exposure prevention devices for roll-holding cameras of the type including a camera body, a film-winding key post carrying a cam, a shutter, a shutter trigger for operating the shutter including a rod and a push button on the end of the rod for releasing the shutter, a collar slidably mounted on the rod, a pair of levers both pivotally mounted on the camera body and provided with cam-engaging portions and resilient portions positioned to engage and release the trigger and collar, said improvement comprising a lost motion connection between the collar and trigger rod, said collar being engageable and movable in one direction by the push button and being engageable and movable in an opposite direction by a second collar fastened to the trigger rod, means carried by the camera body tending to restrain movement of the collar in both directions, a spring tending to thrust the collar and trigger outwardly into a rest position, the collar and push button including exterior walls positioned for engagement by the resilient portions of the pair of lever arms and forming when the collar and push button lie together, continuous smooth slideways on which said resilient portions of the lever arms may slide, said collar and push button being adapted to move relative to each other to engage so that the exterior walls of one may lie against and form a continuation of the exterior walls of the other, said resilient portions of the levers being adapted to engage and move over the slideways formed by the exterior walls of both the collar and the push button, the collar having a normal rest position spaced from the push button in which position the resilient lever portions may engage the external walls of the collar when said pivotally mounted levers are moved to an unlatching position by the cam on the winding key post whereby said resilient portions of the levers may remain on the collar until the push button is moved to engage the push button and collar and to move the collar so that the flexible portions of the levers will move from the collar to the push button along the slideways thereof during the downward movement of the push button to make an exposure.

3. The improvement in double exposure prevention devices for roll-holding cameras defined in claim 2 characterized in that there is a locking shoulder at the point where the push button joins the trigger rod against which the resilient portions of the levers may snap into a latching position as the push button is released to be moved outwardly by the pressure of the spring and before the collar is moved by the second collar on the trigger rod.

4. The improvement in double exposure prevention devices for roll-holding cameras defined in claim 2 characterized by a tapered shoulder on the push button extending downwardly toward the trigger rod, a complemental shaped recess formed in the end of the collar so that when said push button engages the collar the exterior walls of the collar and push button form one continuous surface on which said resilient portions of the levers may slide and whereby said resilient lever portions may slide down a tapered extension on the push button and into a locking position between the trigger and the collar as the push button moves to a normal rest position.

5. The improvement in double exposure prevention devices for roll-holding cameras defined in claim 2 characterized in that the lost motion connection between the collar and trigger rod comprises a friction device mounted on the camera and engaging the collar, for retarding movement of the collar in either of two directions.

6. The improvement in double exposure prevention devices for roll-holding cameras defined in claim 2 characterized in that the lost motion connection between the collar and trigger rod comprises a friction device mounted on the camera and engaging the collar for retarding movement of the collar in either of two directions, said friction device comprising a friction member engaging exterior walls of the collar, said friction washer being fixedly attached to the camera body.

7. The improvement in double exposure prevention devices for roll-holding cameras defined in claim 2 characterized by the second collar affixed to the trigger rod and the push button carried by the trigger rod being spaced a distance greater than the length of the first-mentioned collar whereby movement of the trigger rod in either direction may take place without moving the collar and while the collar is frictionally retained by a friction device mounted on the camera body.

DOUGLASS C. HARVEY.

No references cited.